United States Patent Office.

ARNO BEHR, OF JERSEY CITY, NEW JERSEY, AND HENRY C. HUMPHREY, OF NEW YORK, N. Y.

MANUFACTURE OF STARCH AND SIRUP OR SUGAR FROM CORN.

SPECIFICATION forming part of Letters Patent No. 250,335, dated December 6, 1881.

Application filed September 24, 1881. (No specimens.)

*To all whom it may concern:*

Be it known that we, ARNO BEHR, of Jersey City, New Jersey, and HENRY C. HUMPHREY, of the city and State of New York, have invented a certain Improvement in the Manufacture of Starch and Sirup or Sugar from Corn, of which the following is a specification.

In the ordinary process of manufacture of starch from corn the starch contained in the raw starch-liquor is purified by being deposited on the so-called "starch-tables" or "troughs" over which the starch-liquor is run. Although these troughs are made of great length, a certain portion of starch is carried off in the liquid which overflows from the lower end of each trough. It is sometimes the case, especially when the raw starch-liquor has not been alkalied, that from one-half to three-quarters of the solid matter contained in the liquid which overflows from the lower end of the trough is pure starch. This liquid, which contains the gluten, the fat, and some of the fibers of the corn, constitutes a by-product of the manufacture, of comparatively small value, and the starch which it carries off is therefore lost.

It is the object of our invention to avoid this source of loss in the manufacture of starch; and our invention consists in combining with the manufacture of starch by the use of starch-tables the collection of the liquid which runs from the starch-tables, and its treatment with an amount of sulphuric or other strong acid sufficient to convert the starch in such liquid into sirup or sugar. The conversion may be effected by boiling the liquid in an open vessel; but it is preferable to apply a higher heat and to use a close vessel, into which steam is introduced under pressure. After conversion the acid is neutralized in the ordinary way, and the liquid is separated from the insoluble portions by filtration. After filtration the liquid is concentrated and clarified by the usual means, and the resulting product is a sirup or sugar which can be used for all purposes where perfect purity and absence of color are not required. The residue obtained after conversion contains, in a highly-concentrated form, gluten and fat—that is, it contains the solid matter which has been carried over the lower end of the table and not been rendered soluble by the process of conversion. In this higher state of concentration the fat can be more easily extracted from the residue, and the remaining gluten is of greater value for fertilizing purposes, because of the large percentage of nitrogen it contains in proportion to its volume.

By our process all the starch is utilized, no portion of it being allowed to remain with the gluten. It will therefore be seen that when our process is employed the necessity for the use of extremely-long starch-tables ceases to exist, because all the starch which does not settle in the troughs or starch-tables is subsequently utilized by being converted into sirup or sugar.

Instead of treating the whole of the liquid which overflows from the tables with acid for the purpose of converting the starch, it will generally be found advantageous to concentrate the solid matters contained in the liquid, by settling or otherwise, previous to the treatment with acid, in which case a smaller amount of acid will be required, and a more concentrated saccharine solution be obtained.

We claim as our invention—

The process of manufacturing starch and glucose from corn herein described which consists in manufacturing starch by the usual methods, in which starch tables or troughs are employed, and in treating the fluid which overflows from the tables or troughs with an amount of sulphuric or other strong acid sufficient to convert into sirup or sugar the starch which is present in such overflowing fluid.

ARNO BEHR.
H. C. HUMPHREY.

Witnesses:
H. E. NIESE,
ROBT. MOELLER.